United States Patent
Roylance et al.

(10) Patent No.: US 6,236,427 B1
(45) Date of Patent: May 22, 2001

(54) EDGE PLACEMENT DEVICE

(75) Inventors: Eugene A. Roylance, Boise; Robert D. Morrison, Star, both of ID (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/491,995

(22) Filed: Jan. 26, 2000

Related U.S. Application Data

(63) Continuation-in-part of application No. 09/293,520, filed on Apr. 15, 1999.

(51) Int. Cl.$^7$ .................................................. B41J 2/435
(52) U.S. Cl. .................... 347/249; 347/235; 347/250; 327/153; 327/161; 327/276; 327/291
(58) Field of Search ................................. 347/235, 249, 347/250; 358/296, 1.2, 1.7, 1.9, 1.12; 375/373; 360/45; 327/153, 161, 276, 291; 368/113, 120

(56) References Cited

U.S. PATENT DOCUMENTS

| 5,212,716 | * | 5/1993 | Ferraiolo et al. | 375/373 |
| 5,477,330 | * | 12/1995 | Dorr | 358/296 |
| 5,793,709 | | 8/1998 | Carley | 368/113 |
| 5,990,923 | * | 11/1999 | Morrison | 347/252 |

* cited by examiner

*Primary Examiner*—N. Le
*Assistant Examiner*—Hai C. Pham
(74) *Attorney, Agent, or Firm*—Gregg W. Wisdom

(57) ABSTRACT

An embodiment of an edge placement device is supplied with transition data to generate transitions during a pixel time period corresponding to the transition data. The transition data is supplied by pulse code logic that converts pixel data to the transition data. The embodiment of an edge placement device includes first edge placement logic coupled to taps from a first clock delay chain and second edge placement logic coupled to taps of a second clock phase delay chain. Also included is a phase splitter that generate a first and a second clock phase coupled, respectively, to the first and the second clock delay chain from a clock corresponding to a pixel time period. The first and the second clock phase have rising edges on alternate cycles of the clock. The first and the second edge placement logic each include a plurality of D flip flops. The clock inputs of each of the flip flops in the first and the second edge placement logic are coupled, respectively, to one tap from first or the second clock delay chain. The D inputs of the flip flops of the first and the second placement edge placement logic are coupled, respectively, to a first and a second data phase provided by the pulse code logic. By setting the values of the first and the second data phases, supplied on alternate cycles of the clock, video data is generated having transitions during the pixel time period corresponding to the pixel data.

18 Claims, 10 Drawing Sheets

| PULSE SHAPE BITS | | PULSE WIDTH BITS | | | | | | |
|---|---|---|---|---|---|---|---|---|
| X | X | 0 | 0 | 0 | 0 | 0 | 0 | WHITE DOT |
| 0 | 0 | 0 | 0 | 0 | 0 | 0 | 1 | CENTERED 2/64th PULSE |
| 0 | 1 | 0 | 0 | 0 | 1 | 0 | 0 | SPLIT 5/64th PULSE |
| 1 | 0 | 0 | 0 | 1 | 1 | 1 | 1 | LEFT JUST. 16/64th PULSE |
| 1 | 1 | 1 | 0 | 0 | 0 | 0 | 0 | RIGHT JUST. 33/64th PULSE |
| X | X | 1 | 1 | 1 | 1 | 1 | 1 | BLACK DOT |

FIG.4

EDGE PLACEMENT DEVICE

CROSS REFERENCE TO RELATED APPLICATIONS

This application is a Continuation in Part of a co-pending U.S. patent application having USPTO Ser. No. 09/293,520, naming Eugene A. Roylance as an inventor, and filed on Apr. 15, 1999.

FIELD OF THE INVENTION

This invention relates to modulation of a pulse width. More particularly, this invention relates to controlling the positioning of one or more transitions during a period of time.

BACKGROUND OF THE INVENTION

In an imaging device, such as an electrophotographic printer, copier, or fax machine, that uses a scanning device to expose a photoconductor, imaging data is used to control the application of current to a laser diode to form a latent electrostatic image on the surface of the photoconductor. The laser diode generates a beam that is swept across the surface of the photoconductor. The generation of high quality images can be accomplished by precisely controlling exposure of the photoconductor. The image is quantized into pixels that have a dimension in the direction the beam moves across the surface of the photoconductor. Increasing image quality can be accomplished by decreasing the minimum quantization size of the area developed onto the photoconductor for the dimension of the developed area in the direction the beam is swept across the surface of the photoconductor. In addition to decreasing the minimum quantization size of the area developed, increased image quality is also accomplished by precisely controlling the positioning of the developed area with respect to the direction the beam is swept across the surface of the photoconductor. Decreasing the minimum quantization size can be accomplished by decreasing the minimum time period that the laser diode can be turned on during a sweep across the surface of the photoconductor. A need exists for a method and apparatus that will permit a decrease in the minimum laser on time period while precisely positioning the corresponding developed area on the surface of the photoconductor.

SUMMARY OF THE INVENTION

Accordingly, in an imaging device, an edge placement device to generate a transition has been developed. The edge placement device includes first edge placement logic configured to generate a first plurality of outputs using a first plurality of signals and a first data phase. The edge placement device also includes second edge placement logic configured to generate a second plurality of outputs using a second plurality of signals and a second data phase. Additionally, the edge placement device includes transition logic configured to generate the transition using the first plurality of outputs and the second plurality of outputs.

In an imaging device, a method for generating a plurality of transitions, includes generating a first plurality of logic values using a first predetermined value. The method also includes generating a first group of the plurality of transitions, according to the first plurality of logic values, after a first clock changes state in a first cycle of a second clock. Furthermore, the method includes generating a second plurality of logic levels using a second predetermined value. Additionally, the method includes generating a second group of the plurality of transitions, according to the second plurality of logic values, after a third clock changes state in a second cycle of the second clock, where the first clock and the third clock change states in alternate cycles of the second clock.

An electrophotographic imaging device for forming images using print data includes a photoconductor and a rasterizer to generate pixel data corresponding to the print data. The electrophotographic imaging device further includes pulse code logic to generate a first data phase and a second data phase from the pixel data. Additionally, the electrophotographic imaging device includes an edge placement device to generate video data using the first data phase, the second data phase, a first clock phase, and a second clock phase. Also, the electrophotographic imaging device includes a photoconductor exposure system for forming a latent electrostatic image on the photoconductor corresponding to the video data.

DESCRIPTION OF THE DRAWINGS

A more thorough understanding of embodiments of the fixing device control system may be had from the consideration of the following detailed description taken in conjunction with the accompanying drawings in which:

Shown in FIG. 1 is a block diagram representation of an embodiment of an electrophotographic imaging device including an embodiment of an edge placement device and an embodiment of a photoconductor exposure system.

Figure 2:
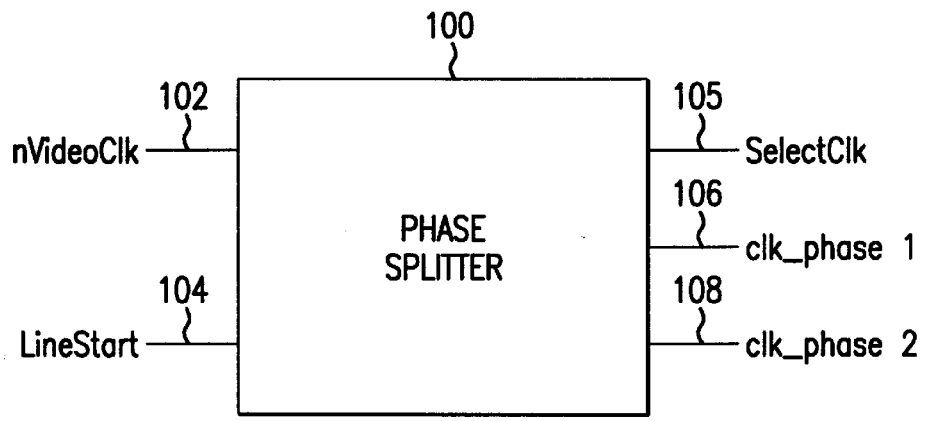

Shown in FIG. 2 is a simplified block diagram of the outputs of a clock phase generator.

Figure 2A:
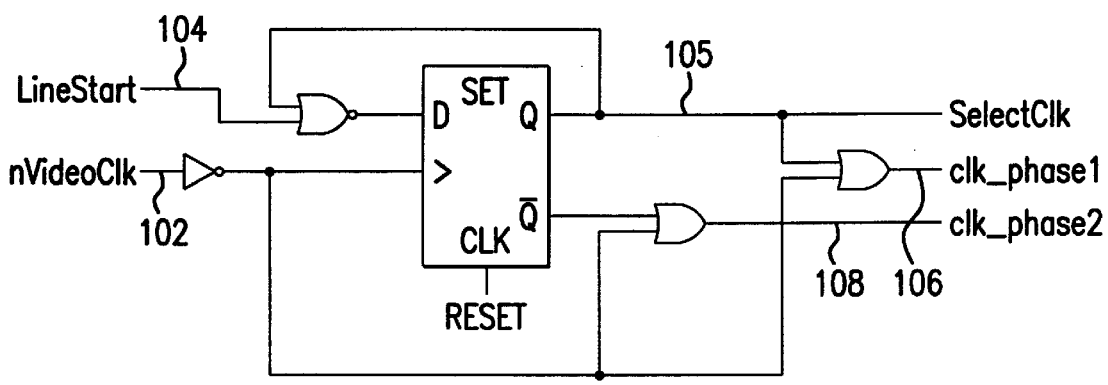

Shown in FIG. 2A is an implementation of the clock phase generator.

Figure 3:
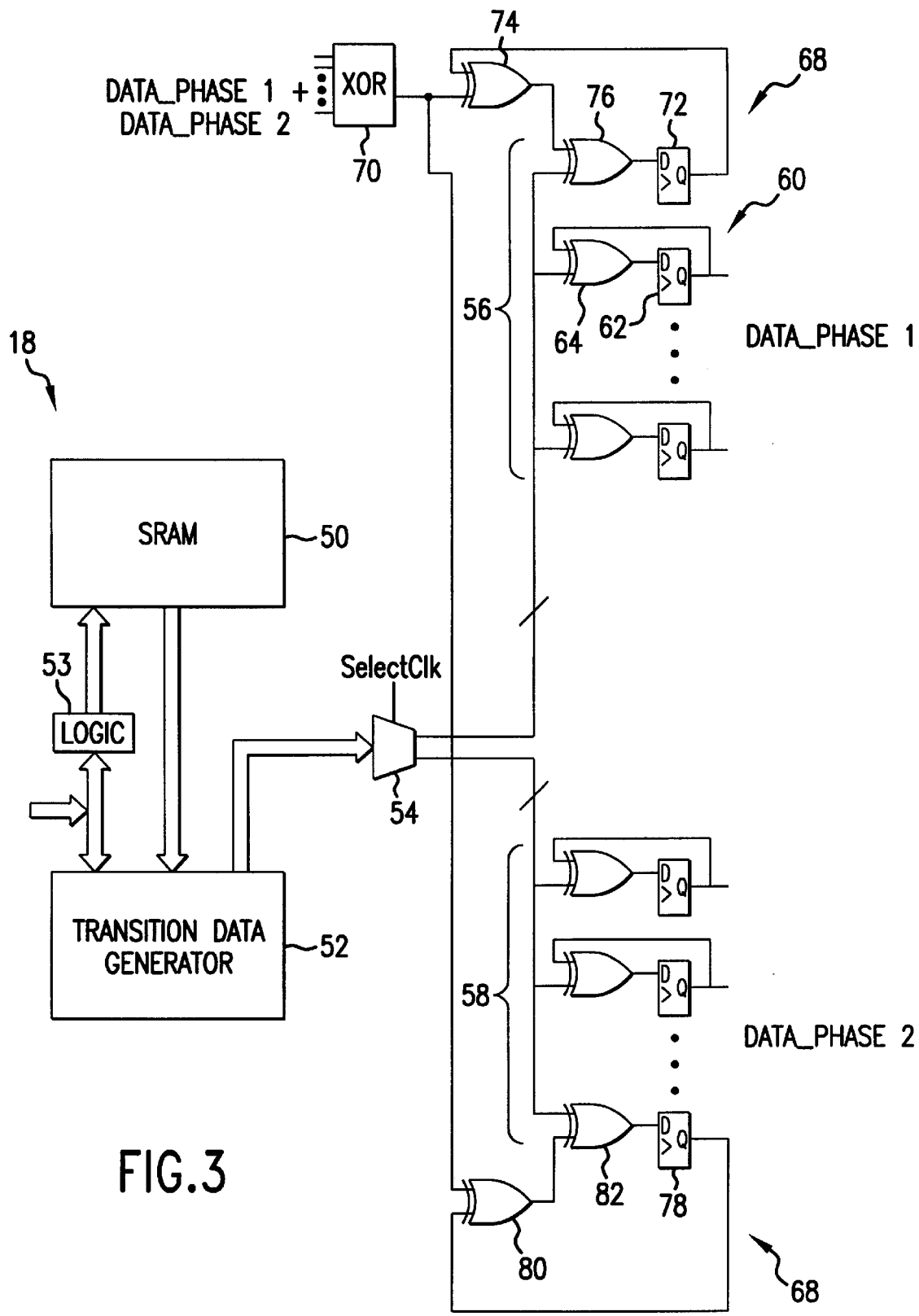

Shown in FIG. 3 is a simplified block diagram of pulse code logic.

Shown in FIG. 4 is a table that relates exemplary pixel data values to pulse shapes and pulse widths.

Figure 5:
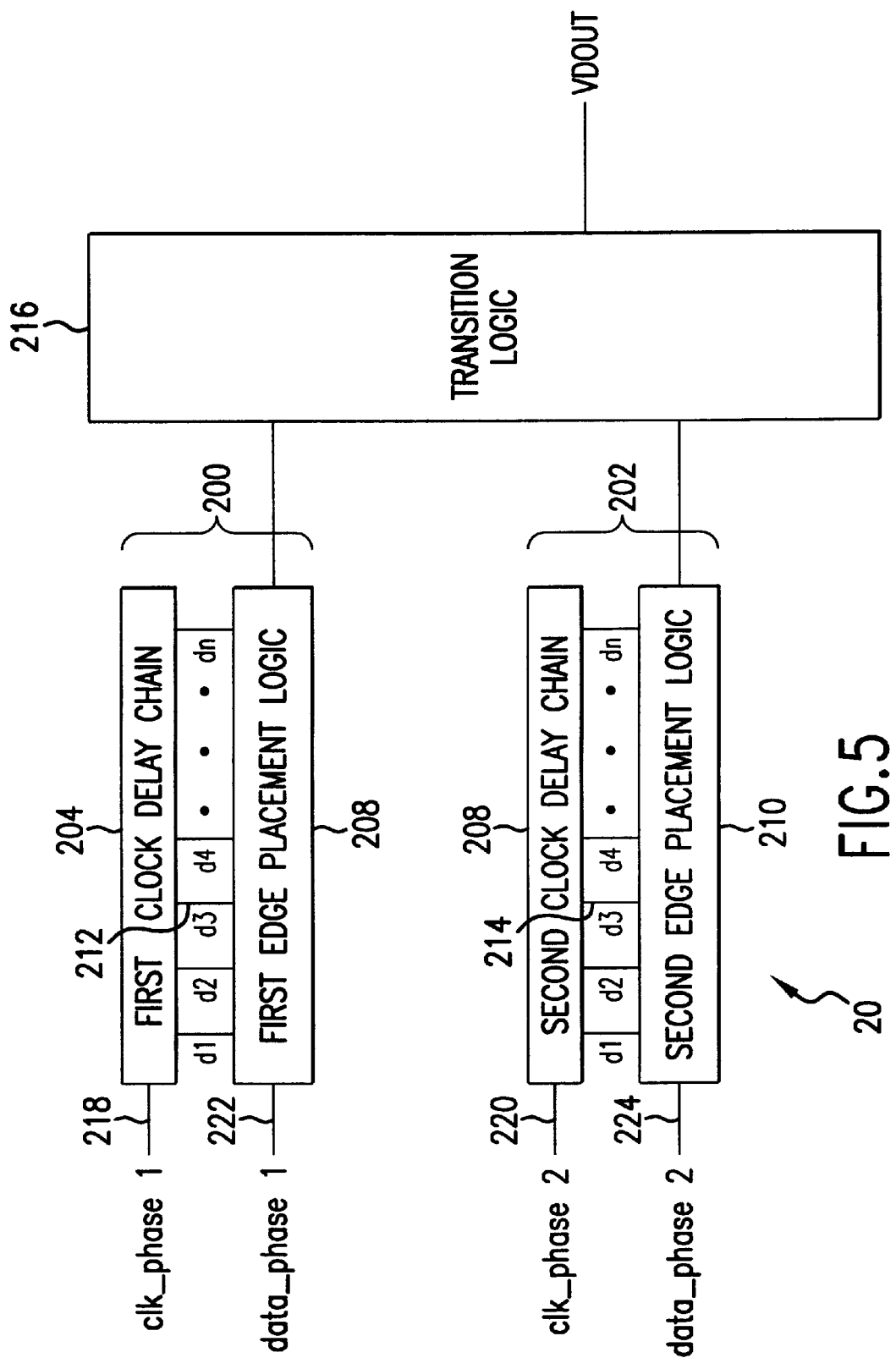

Shown in FIG. 5 is a simplified block diagram of an embodiment of the edge placement device.

Figure 6:
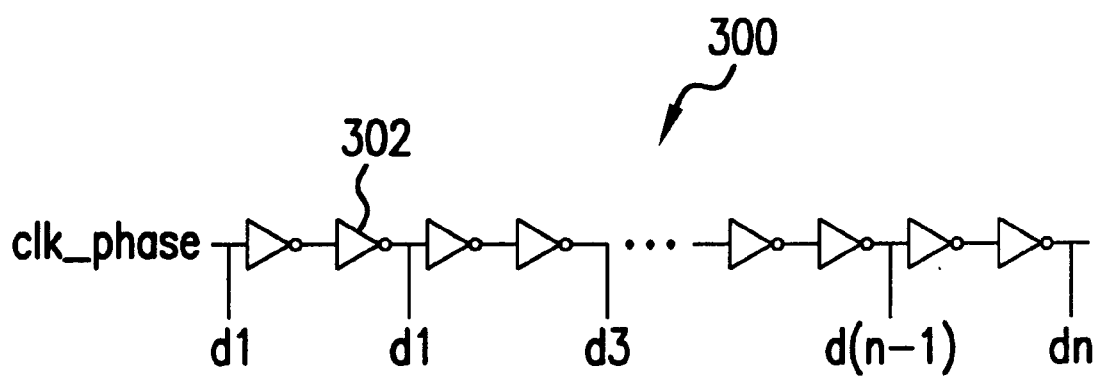

Shown in FIG. 6 is a simplified schematic diagram of an embodiment of a clock delay chain.

Figure 7:
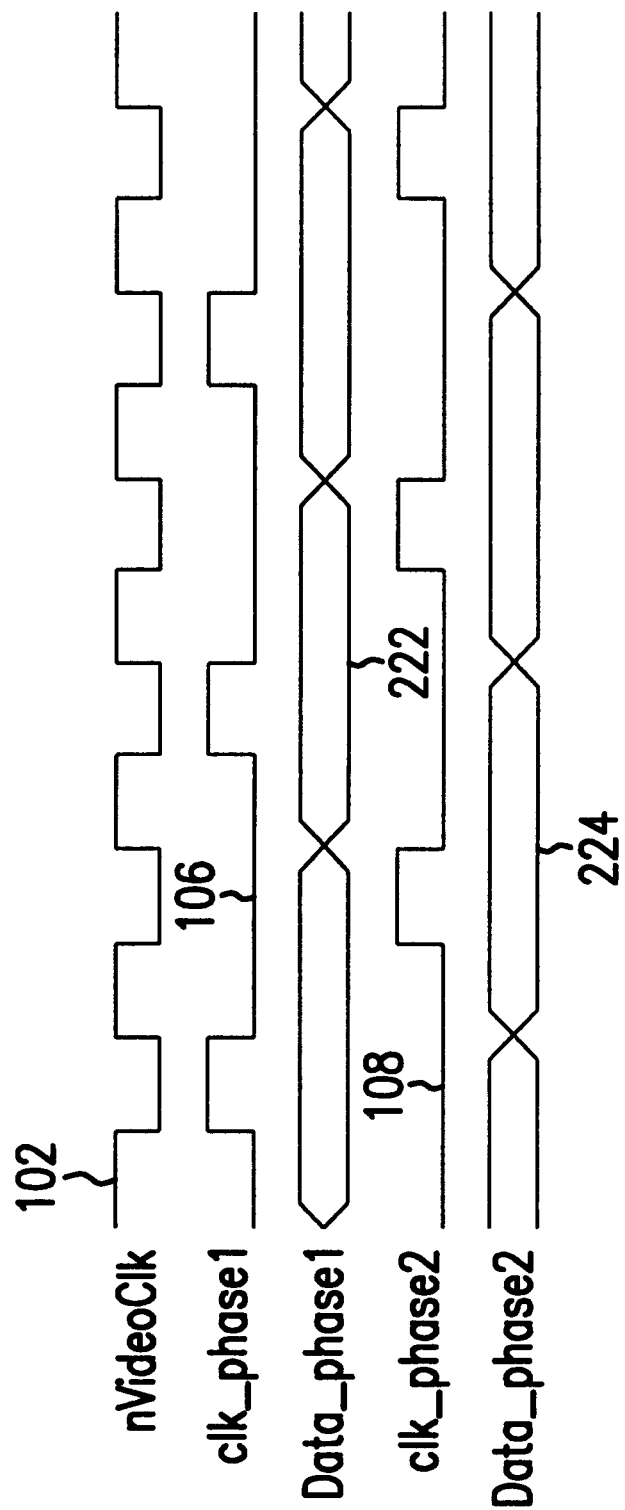

Shown in FIG. 7 is a timing diagram of signals supplied to the embodiment of the edge placement device.

Figure 8:
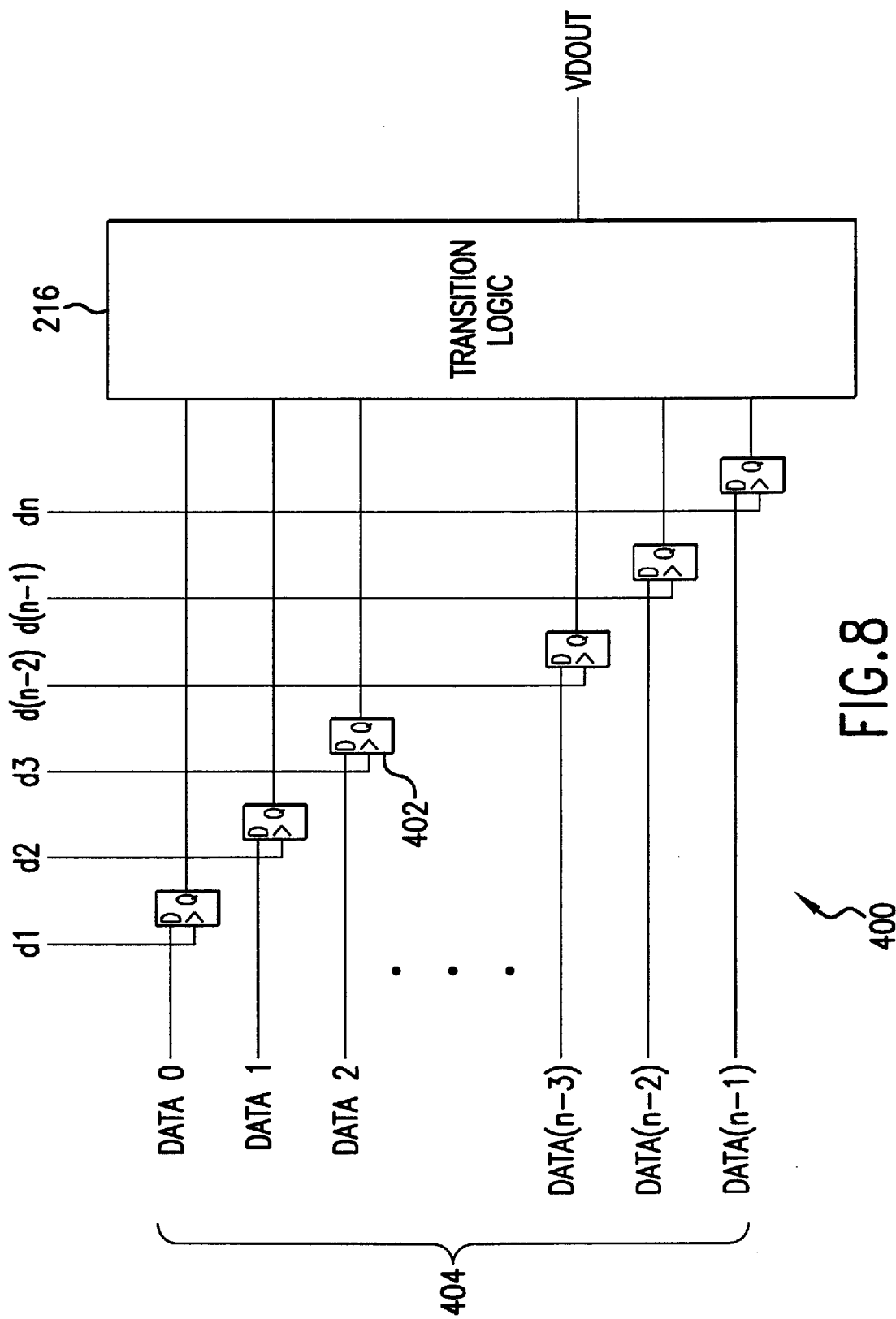

Shown in FIG. 8 is an embodiment of edge placement logic.

Figure 9:
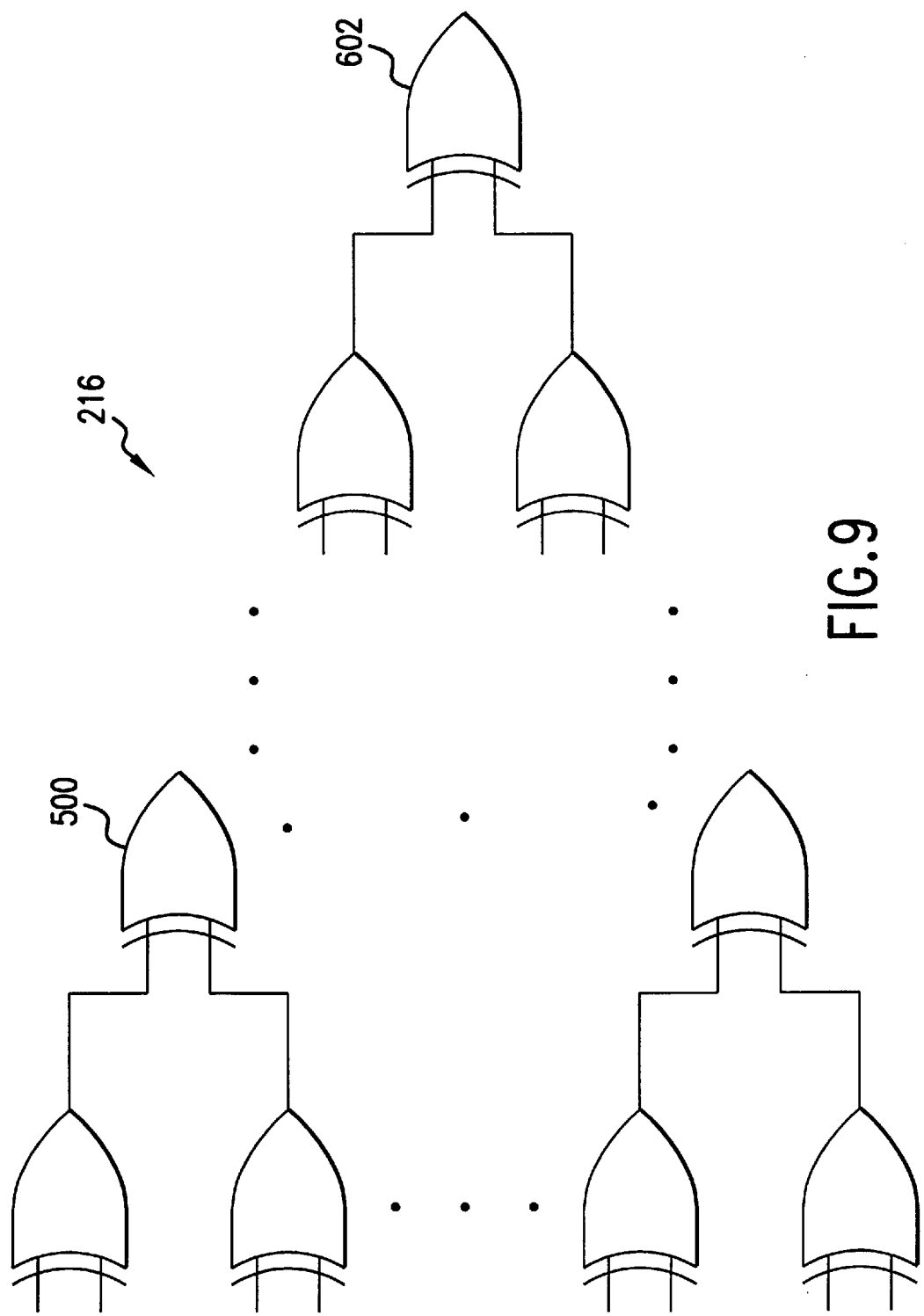

Shown in FIG. 9 is a simplified schematic of an embodiment of the transition logic.

Figure 10:
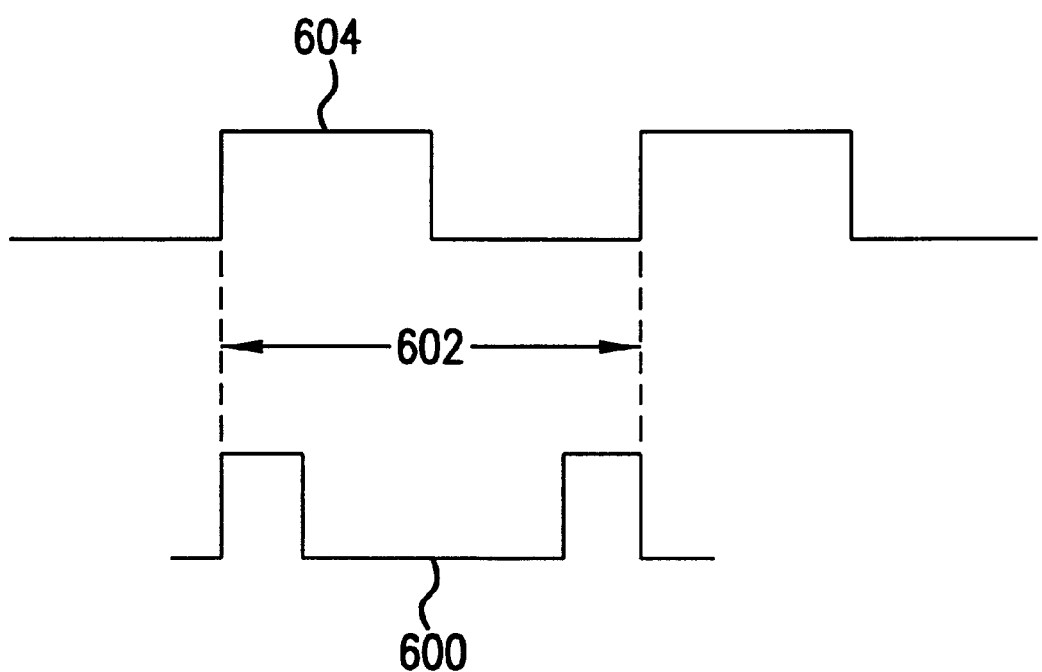

Shown in FIG. 10 is an exemplary pulse generated by the embodiment of the edge placement device.

DETAILED DESCRIPTION OF THE DRAWINGS

The edge placement device is not limited to the exemplary embodiments disclosed in this specification. Although an embodiment of the edge placement device will be discussed in the context of an electrophotographic imaging device, such as an electrophotographic printer, it should be recognized that embodiments of the edge placement device have application in devices and systems that can benefit from having the capability to provide pulses of precisely defined length at precisely defined times. Some examples of these types of devices and systems include imaging devices such as copiers, fax machines and ink jet printers.

Figure 1:
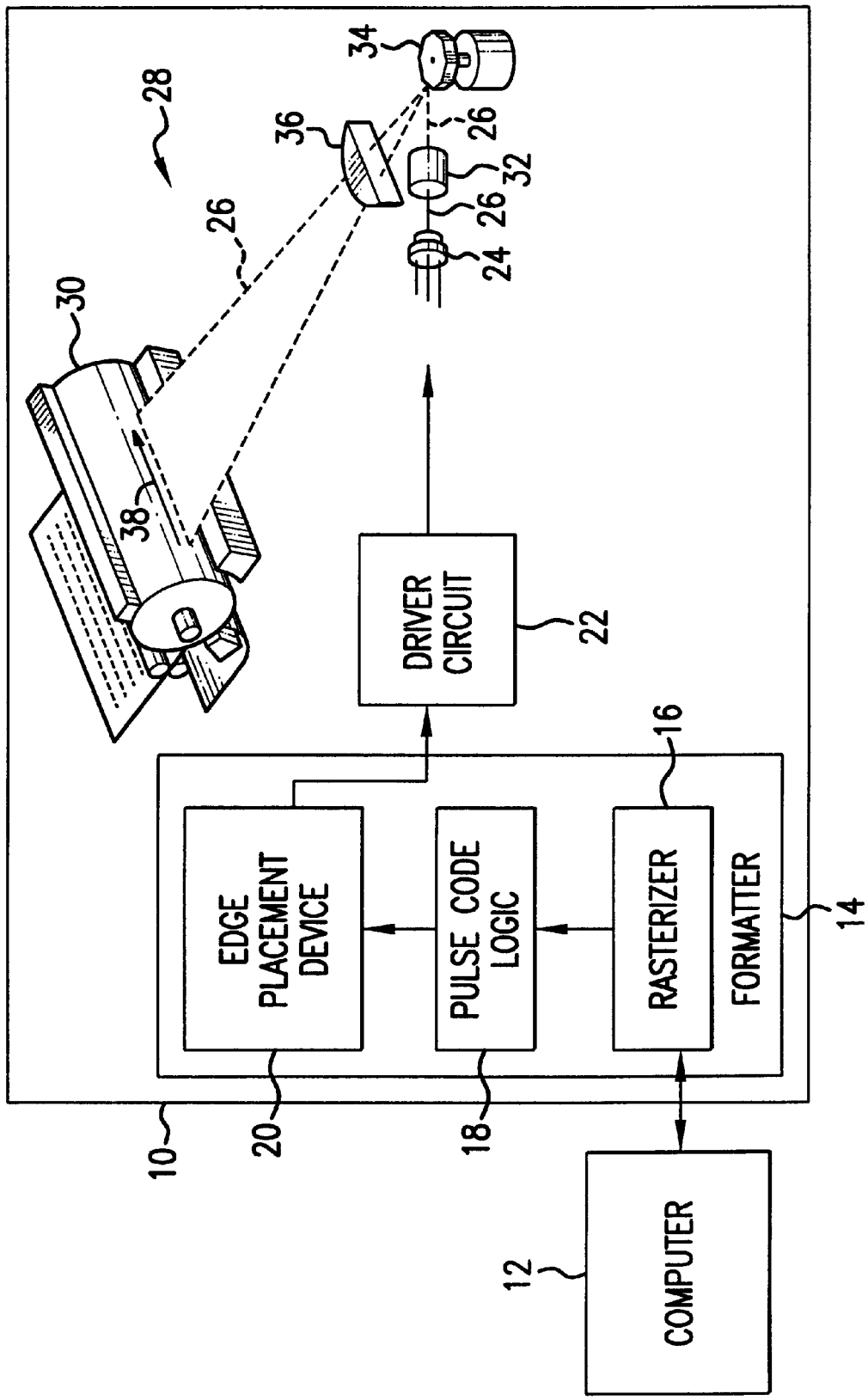

Shown in FIG. 1 is a simplified block diagram of an embodiment of an imaging device, such as electrophotographic printer 10, including an embodiment of the edge placement device. Electrophotographic printer 10 forms an image on media composed of pixels. Computer 12 provides data, including print data, to a formatter 14 included in electrophotographic printer 10. Formatter 14 includes a rasterizer 16 that converts the print data into data corresponding to each pixel. Rasterizer 16 may include dedicated hardware for generating the pixel data or it may include a processor executing firmware (software embedded in an integrated circuit) to generate the pixel data. Pulse code logic 18, also included in formatter 14, receives the pixel data from rasterizer 16 and generates data used by an embodiment of an edge placement device, edge placement device 20, included in formatter 14. Edge placement device 20 uses the data supplied by pulse code logic 18 to generate video data. Driver circuit 22 receives the video data from edge placement device 20 and controls the flow of drive current through laser diode 24. In response to the drive current, laser diode 24 generates a pulsating beam 26, with the time period of the pulses of the beam corresponding to the time period of the pulses of the video data. An embodiment of a photoconductor exposure system, such as photoconductor exposure system 28, controls the movement of pulsating beam 26 from laser diode 24 across the surface of a photoconductor, such as photoconductor drum 30. Pulsating beam 26 passes through collimating lens 32, is reflected from rotating scanning mirror 34, and passes through flat focusing lens 36 before impinging upon photoconductor drum 30. Pulsating beam 26 exposes regions on the surface of photoconductor drum 30 that have a dimension (in the direction 38 pulsating beam 26 moves across the surface of photoconductor drum 30) corresponding to the time period of the pulses of the video data. The term "video data", as it is used in this specification, refers to a signal that changes state as necessary to cause pulsation of pulsating beam 26 so that an image is formed on photoconductor drum 30 corresponding to the print data provided by computer 12.

The operation of the electrophotographic imaging process makes use of other elements not shown in FIG. 1. Because these other elements are not essential to a description of the embodiments of the transition placement circuit, they have been omitted. A charging device, such as a charge roller, charges the surface of photoconductor drum 30 in preparation for selective discharge by pulsating beam 26 to form a latent electrostatic image on the surface of photoconductor drum 30. A developing device, such as a developing roller, including pigment particles, such as toner, is used to selectively transfer toner onto the latent electrostatic image. A transfer device, such as a transfer roller, charges a surface of media (opposite the surface of the media facing photoconductor drum 30) to a polarity opposite that of the toner developed onto the latent electrostatic image. Through the electrostatic attractive force resulting from the operation of the transfer roller, the toner developed onto the latent electrostatic image on photoconductor drum 30 is transferred onto the media in substantially the same form as the image. Subsequently, the toner is fixed to the surface of the media by a fixing device.

Shown in FIG. 2 is a simplified block diagram of an embodiment of a clock phase generator, phase splitter 100. The input nVideoClk 102 is an inverted version of a video clock signal, VideoClk. In photoconductor exposure system 28, a beam detect signal is generated very close in time to the start of the sweep of pulsating beam 26 across the surface of photoconductor drum 30. The beam detect signal is used to synchronize an asynchronous clock to the beam detect to generate the VideoClk. This ensures that video data will be supplied synchronously with the beginning of the sweep of pulsating beam 26 across photoconductor drum 30. The nVideoClk 102 is used to generate two clock phases used to place transitions occurring in the stream of video data generated by edge placement device 20 within pixel time periods. The VideoClk signal is generated by selecting one of a plurality of delayed versions of the asynchronous clock that is closest in phase to the transition of the beam detect signal. The period of VideoClk signal multiplied by the rate at which the beam is swept across photoconductor drum 30 is substantially equal to a dimension of a pixel in the direction pulsating beam 26 is moved across photoconductor drum 30. This dimension will be referred to as the "pixel width". Therefore, the period of the nVideoClk 102 is substantially equal to the time pulsating beam 26 moves across the pixel.

Generation of the VideoClk is accomplished by a clock generator circuit. U.S. Pat. Nos. 5,760,816 and 5,438,353, each issued to Robert Morrison, each assigned to Hewlett-Packard Company, and each incorporated by reference in their entirety into this specification, disclose clock generator circuits capable of generating the VideoClk signal synchronized to the beam detect signal.

LineStart input 104 supplied to phase splitter 100 is a delayed version of the beam detect signal that has been re-synchronized to the rising edge of the VideoClk signal. When LineStart 104 transitions from a low level to a high level, SelectClk 105 is reset to a low level to synchronize SelectClk 105 with LineStart 104. Phase splitter 100 generates two separate clock phases from the nVideoClk 102. First clock phase 106 provides a pulse, having a width substantially equal to the time for which the nVideoClk 102 is at a low level, with a rising edge substantially simultaneous with the falling edge of the nVideoClk 102 (therefore, substantially simultaneous with the rising edge of the VideoClk) on alternating periods of the nVideoClk 102. Second clock phase 108 provides a pulse, also having a width substantially equal to the time for which the nVideoClk 102 is at a low level, with a rising edge substantially simultaneous with the falling edge of the nVideoClk 102 (therefore, substantially simultaneous with the rising edge of the VideoClk) for those periods of the nVideoClk 102 during which first clock phase 106 is not generated.

SelectClk 105 is generated from nVideoClk 102 by counting the rising edges of nVideoClk 102. SelectClk 105 can be regarded as the output of a single bit counter that alternates between a high level and a low level. When SelectClk 105 is at a low level, a rising edge on nVideoClk causes it to transition to a high level. Then, the next rising edge of nVideoClk 102 causes SelectClk 105 to transition from a high level to a low level. The transitions of SelectClk 105 are synchronized to the falling edge of nVideoClk 102. SelectClk 105 has a frequency one half that of nVideoClk 102. As will be described in more detail below, SelectClk 105 is used by pulse code logic 18 to direct transition data to logic within pulse code logic 18.

Shown in FIG. 2A is an implementation of a clock phase generator. The logic shown in FIG. 2A generates first clock phase 106 and second clock phase 108 so that rising edges of pulses of each of these phases are generated on the falling edge of nVideoClk 102 on alternate cycles of nVideoClk. In addition, the logic generates each of these clock phases to have one half the frequency of nVideoClk 102. Furthermore, the implementation shown in FIG. 2A uses an inverted version of the nVideoClk 102 as a gate to generate first clock phase 106 and second clock phase 108 so that the rising edges of these signals are synchronized with the falling edge of nVideoClk 102. Because the nVideoClk is an inversion of the VideoClk, first clock phase 106 and second clock phase 108 are synchronous with the rising edge of the VideoClk.

Shown in FIG. 3 is a simplified block diagram of pulse code logic 18. The input to pulse code logic 18 includes pixel data generated by rasterizer 16. For each pixel a byte is used to define the pulse shape and pulse width of the pixel. The term "pulse width" refers to the total fraction (realizing that non-contiguous portions within a single pixel can be exposed) of the pixel in the direction pulsating beam 26 is swept which is to be exposed by pulsating beam 26. The term "pulse shape" refers to the relative portioning of the exposed regions within the pixel. Although four pulse shapes are permitted in this particular implementation, it should be recognized that with a different number of bits used a larger or smaller number of pulse shapes could be defined. For a larger number of possible pulse shapes, more bits would be required to select the desired pulse shape. The two highest order bits of the pixel data byte are used to select one of four pulse shapes. The lower order six bits are used to specify the pulse width. By using six bits increments in the pulse width done to 1/64th of a pixel could potentially be realized.

Shown in FIG. 4 is a table illustrating exemplary pulse widths for the four possible pulse shapes. The four allowed pulse shapes in this implementation are a centered justified pulse, an evenly split pulse with the portions left and right justified within the pixel (referred to as a split justification pulse), a left justified pulse, and a right justified pulse. The pulse shapes corresponding to specific values of the two highest order bits are listed in FIG. 4. With both of the highest order bits set at a low logic level, a center justified pulse is generated in the pixel. With both of the highest order bits set at a high logic level, a right justified pulse is generated. The other possible settings for the two highest order bits will generate a left justified pulse and a split pulse as listed in FIG. 4. Because six bits are available to define the pulse width, the minimum possible pulse width resolution increment is 1/64th of the pixel width. However, as will be discussed in more detail, the actual resolution increment that can be achieved will be affected by the way in which edge placement device 20 is implemented and the size of SRAM 50. With all six bits set to a low logic level, the pulse width is zero, corresponding to a white pixel (no exposure within the pixel) With all six bits set to a logic high level, the pulse width is equal to the pixel width, corresponding to a black dot (total exposure within the pixel).

The table shown in FIG. 4 is exemplary of how the bits of pixel data byte may be used to define the pulse width and the pulse shape. In electrophotographic printer 10, the lowest order bit of the six lower order bits is not used for addressing SRAM 50. Therefore, the minimum possible resolution that can be achieved in this implementation is 1/32 of a pixel width. For electrophotographic printer 10, it was determined that a minimum possible resolution of 1/32 of a pixel width was sufficient. However, it should be recognized that the principles disclosed here are not limited to five bits of resolution or four pulse shapes. By using a different number of bits to select the pulse shape or pulse width, a greater or lesser number of pulse shapes could be selected and increased or decreased resolution could be achieved.

The five highest order of the six lower order bits of the pixel data byte are used as an index to access SRAM 50. The memory space in SRAM 50 is partitioned so that an access to SRAM 50 generates an output including four six bit codes. These four six bit codes are loaded into transition data generator 52. The two highest order bits of the pixel data byte are also loaded into the transition data generator. These four six bit codes and the two highest order bits include the information necessary to generate transition data for the four pulse shapes at the specified pulse width. The six bit codes and the highest order two bits are used by transition data generator 52 to set bits for a transition data value used by edge placement device 20 to generate a pulse having a pulse shape and pulse width as specified by the pixel data byte.

SRAM 50 includes sufficient storage capacity to hold four six bit codes for each of 32 possible pulse widths. However, it should be recognized that the required storage capacity of SRAM 50 will change depending upon the desired minimum possible resolution and the desired pulse shape. Ideally, the increments between successive pulse width values would be 1/32 of the pixel width. However, the actual resolution achieved is determined based upon characteristics of edge placement device 20 more fully explained later in this specification. A calibration performed on edge placement device 20 will determine the values of the six bit codes so that the transition data values supplied by transition data generator 52 will come as close as possible to generating the ideal pulse as characteristics of edge placement device 20 will allow.

The six bit codes stored in SRAM 50 are determined in the calibration performed upon edge placement device 20 prior to the printing of each page. These six bit codes and the highest order two bits of the pixel data byte contain information used by transition data generator 52 to determine the locations of the transitions in the pulse. Center justified and left justified pulse shapes require the determination of two transitions. A right justified pulse requires generation of only one transition because the pulse extends to the end of the pixel time period and the transition does not occur within that pixel. A split justified pulse requires generation of three transitions. As will be discussed later, the number of transitions can be affected by the previous pixel. Using the six bit codes and the two higher order bits of the pixel data byte, transition data generator 52 generates the bit values of the transition data to cause transitions at the correct time during the pixel time period to form the selected pulse shape having the selected pulse width.

The bit values of the transition data values generated by transition data generator 52 are set to a low logic level where no transition is desired and set to a high logic level where a transition is desired. For example, on a center justified pulse, a bit at a location in the transition data value corresponding to the rising edge of the center justified pulse (a rising edge bit) is set to a high logic level and a bit at a location in the transition data value corresponding to the falling edge of the center justified pulse (a falling edge bit) is set to a high logic level. The remaining bits of the transition data value are set to a low logic level by transition generator 52. When this transition data value is supplied to the remaining sections of edge placement device 20, the output goes to a logic high level at a time within the pixel time period corresponding to the placement of the rising edge bit and then goes low at a time within the pixel time period corresponding to the placement of the falling edge bit.

The four six bit codes supplied by SRAM 50 are defined as follows. One six bit code specifies the location of a high logic level bit within the transition data value corresponding to the falling edge of a left justified pulse. One six bit code specifies the location of a high logic level bit within the transition data value corresponding to the rising edge of a right justified pulse. One six bit code specifies a first edge of either a split justified pulse or a center justified pulse. And, one six bit code specifies a second edge of either a split justified pulse or a center justified pulse.

Consider the generation of the transition data value for a left justified pulse. Using the highest order two bits of the pixel data byte, the transition data generator 52 selects the six bit code corresponding to a left justified pulse. Because the highest order two bits specify a left justified pulse, transition generator sets the lowest order bit of the transition data value to a high logic level to generate a transition at the left edge of the pixel for the rising edge of the left justified pulse. The six bit code selected includes a value that specifies which bit of the transition data value should be set to a logic high level to generate the falling of the left justified pulse. Accordingly, transition data generator 52 sets the correct bit of the transition data value to a high logic level to generate the falling edge of the left justified pulse. All other bits of the transition data value are set to a low logic level.

Consider the generation of the transition data value for a right justified pulse. Using the highest order two bits of the pixel data byte, the transition data generator 52 selects the six bit code corresponding to a right justified pulse. The six bit code selected includes a value that specifies which bit of the transition data value should be set to a high logic level to generate the rising edge of the right justified pulse. Accordingly, transition data generator 52 sets the correct bit of the transition data value to a high logic level to generate the rising edge of the right justified pulse. All other bits of the transition data value are set to a logic low level. As will be described later, the falling edge of the right justified pulse is accounted for in the transition data value for the following pixel.

Consider the generation of the transition data value for a center justified pulse. For a center justified pulse a rising and falling edge need to be specified. Using the highest order two bits of the pixel data byte, transition data generator 52 selects the two six bit codes specifying the first edge and the second edge. The six bit code corresponding to the first edge includes a value that specifies which bit of the transition data value should be set to a high logic level to generate the rising edge of the center justified pulse. The six bit code corresponding to the second edge includes a value that specifies which bit of the transition data value should be set to a high logic level to generate the falling edge of the center justified pulse. Accordingly, transition data generator 52 sets the correct bits of the transition data value to a high logic level to generate the rising edge and the falling edge of the center justified pulse. All other bits of the transition data value are set to a logic low level.

The locations of the non-pixel edge transitions for split justified pulses are defined so that the six bit codes that are used to specify the transitions in a center justified pulse can be used to specify the corresponding transitions in a split justified pulse. This allows four six bit codes to specify transitions for four pulse shapes. The two six bits codes that specify the location of the rising edge and the falling edge of a center justified pulse having a given pulse width also specify, respectively, the location of the falling edge of the left portion of a split justified pulse and the rising edge of the right portion of a split justified pulse. However, the pulse width of the split justified pulse specified by these two six bit codes is the complement of the pulse width of the center justified pulse specified by these two six bit codes. To generate a split justified pulse using the two six bit codes that define transitions for the related center justified pulse and having a width as specified by five bits defining the width, the complementary width relationship between the related center justified pulse and the split justified pulse is taken into account.

Logic 53 accounts for the complementary width relationship for the case in which a split justified pulse is specified. Logic 53 receives the pixel data byte. If logic 53 determines, from the two highest order bits, that a pulse shape other than a split justified pulse is specified, then logic 53 passes the highest order five bits of the lowest order six bits of the pixel data byte (that is, those bits specifying the pulse width) to the address inputs of SRAM 50. However, if the two highest order bits of the pixel data byte specify that the pulse shape is a split justified pulse, then logic 53 performs a subtraction of the bits specifying the pulse width from a value of 32 to determine the address in SRAM 50 containing the two six bit codes defining the transition locations that will generate a split justified pulse having the width specified by the pixel data byte. The result of this subtraction is passed to the address inputs of SRAM 50 to generate the two six bit codes that will specify the transition locations for the split justified pulse having the specified pulse width.

Consider the generation of the transition data value for a split justified pulse. For a split justified pulse a falling and two rising edges need to be specified. Because the highest order two bits specify a split justified pulse, transition generator sets the lowest order bit of the transition data value to a high logic level to generate a transition at the left edge of the pixel for the rising edge of the split justified pulse. Using the highest order two bits of the pixel data byte, the transition data generator 52 selects the two six bit codes specifying the first edge and the second edge. The six bit code corresponding to the first edge includes a value that specifies which bit of the transition data value should be set to a high logic level to generate the falling edge of the left portion of the split justified pulse. The six bit code corresponding to the second edge includes a value that specifies which bit of the transition data value should be set to a high logic level to generate the rising edge of the right portion of the split justified pulse. All other bits of the transition data value are set to a logic low level. As will be described later, the falling edge of the split justified pulse is accounted for in the transition data value for the following pixel.

With the lower order six bits of the pixel data byte set to a logic low level, a white pixel is specified and therefore there are no transitions in the output of edge placement device 20 during the corresponding pixel time period. For a white pixel, transition data generator 52 will generate the transition data value having all bits set to a logic low level. The transition data value corresponding to a white pixel is generated based upon the four six bit codes stored in SRAM 50 in the location addressed when the lower order six bits of the pixel data byte are set to a logic low level. The six bit codes corresponding to a left justified pulse and right justified pulse have values greater than the number of delay elements in either of the clock delay chains shown in FIG. 5. When transition data generator 52 selects either of these six bit codes (using the two higher order bits of the pixel data byte) it compares the values of the six bit codes to the number of delay elements in either of the clock delay chains of FIG. 5. If the values of the six bit codes are greater than the number of delay elements, transition data generator 52 generates a transition data value with all of its bits at a logic low level. Similarly, if the six bit code corresponding to what would be the rising edge of a center justified pulse or the falling edge of the left portion of a split justified pulse has a value greater than the number of delay elements, then transition data generator 52 generates a transition data value with all of its bits at a logic low level. Specifying a white pixel in this manner allows the generation of a white pixel in the same fashion as a pixel having transitions, thereby allowing for a more simple hardware implementation than an implementation which handled a white pixel as separate case.

The transition data is provided to the input of gating switch 54. Gating switch 54 directs the transition data to either a first set of transition latches 56 or a second set of transition latches 58. The logic level of SelectClk 105 determines whether the selected transition data is sent to first set of transition latches 56 or second set of transition latches 58. The set of transition latches not receiving the transition data, according to the logic level of SelectClk 105, has all of the inputs of its transition latches set to a low logic level. The outputs of first transition latches 56 form data_phase 1 and the outputs of second transition latches 58 form Data_phase 2. As previously mentioned, SelectClk 105 toggles at one half the frequency of nVideoClk 102 synchronized with the falling edge of nVideoClk 102. When SelectClk 105 is at a high level it sends the selected transition data to first set of transition latches 56. When SelectClk 105 is at a low level it sends the selected transition data to second set of transition latches 58. Because the frequency of SelectClk 105 is one half that of nVideoClk 102, transition data is sent to first set of transition latches 56 and second set of transition latches 58 on alternate cycles of nVideoClk.

Transition latch 60 is representative of the transition latches in first set of transition latches 56 and second set of transition latches 58. Included in transition latch 60 is a storage element, such as D flip flop 62, and XOR gate 64. XOR gate 64 is used to combine the Q output from the previous value of that transition data bit with the present value of the transition data bit provided by gating switch 54. With the feedback provided by XOR gate 64, each of the transition latches operates to toggle the output of the transition latch from the previous value if the current input is at a high logic level and operates to keep the previous value of the transition latch output if the current input is at a low logic level. If the previous value of the transition latch output is at a high logic level or low logic level and the transition data bit is at a high logic level, the transition latch output will transition from, respectively, a high logic level to a low logic level, or from a low logic level to a high logic level. If the transition data bit is at a low logic level, the transition latch output will not change. Therefore, the transition data provided by transition data generator 52 includes instructions to toggle or not toggle the transition latch output. Edge placement device 20 uses the values of Data_phase 1 and Data_phase 2 to place transitions in the pixel.

There is a special case for transition latch 66 and transition latch 68, corresponding to the lowest order bit of the transition data value for both data phases. For ether a split justified pulse or a right justified pulse, the transition data value does not include a bit set to a high logic level corresponding to the last bit in the transition data value. The bit that is set to transition the output of edge placement device 20 from a low level to a high level is not followed by a bit to transition the output from a high level to a low level at the right edge of the pixel. Instead, this transition is accounted for in the next pixel. The location of the falling edge of the right half of a split justified pulse or the falling edge of a right justified pulse is determined in the next pixel for image quality reasons. Suppose a right justified pixel was follow by a left justified pixel. If the transition data value for the right justified pixel had the bit corresponding to the right edge of the pixel set to a high logic level, the output of edge placement device 20 would transition from a high level to a low level. Then, the bit of the transition data value corresponding to the left edge of the next pixel (if the left side of the next pixel was to be exposed) would cause the output of edge placement device 20 to transition from a low level to a high level. Because of this transition, there may be a very narrow unexposed gap on photoconductor drum 30 between the pixel edges where no gap should exist. By using the next pixel to set the falling edge of the right justified or falling edge of the right half of the split justified pulse, this gap is prevented.

To implement the transition latch 66 and transition latch 68, the output of edge placement device 20 from the right edge of the previous pixel must be taken into account. The right edge of the previous pixel is determined by counting the number of logic high level bits in the data_phase 1 and the data_phase 2 outputs. If this is an even number, then the output of edge placement device 20 at the right edge of the previous pixel is at a low level. If this is an odd number, then the output of edge placement device 20 at the right edge of the previous pixel is at a high level. To determine whether an odd or even number of logic high levels are present in data_phase 1 and data_phase 2, XOR block 70 is used. The inputs to XOR block 70 are data_phase 1 and data_phase 2. XOR block 70 could be implemented using cascade connected two input XOR gates. However, it should be recognized that there are other possible implementations. The important performance characteristics are that an even number of high level inputs will generate a low level output and an odd number of high level inputs will generate a high level output. The output of XOR block 70 is combined with the output of D flip flop 72 in XOR gate 74. The output of XOR gate 74 is combined with the lowest order bit of the transition data value for data_phase 1 of the current pixel in XOR gate 76. The output of XOR gate 76 is coupled to the D input of D flip flop 72. The output of XOR block 70 is also combined with the output of D flip flop 78 in XOR gate 80. The output of XOR gate 80 is combined with the lowest order bit for the data_phase 2 value of the current pixel in XOR gate 82. The output of XOR gate 82 is coupled to the D input of D flip flop 78.

The outputs of the logic gates associated with transition latch 66 include information about the right edge of the previous pixel and the left edge of the current pixel. The output of XOR block 70 represents the value of the video data at the output of edge placement device 20 at the right edge of the previous pixel. If the output of XOR block 70 is at a high logic level, this indicates that the output of edge placement device 20 at the right edge of the previous pixel is at a high logic level. If the output of the XOR block 70 is at a low logic level, this indicates that the output of edge placement device 20 at the right edge of the previous pixel is at a low logic level. The value of the lowest order bit of the transition data value for data_phase 1 represents the desired value of the video data at the output of edge placement device 20 at the left edge of the current pixel. If this value is at a low logic level, this indicates that the output of edge placement device 20 at the left edge of the current pixel should be a low logic level. If this value is at a high logic level, this indicates that the output of edge placement device 20 at the left edge of the current pixel should be a high logic level. The output of XOR gate 74 represents the logic level necessary at the output of D flip flop 72 to set the output of edge placement device 20 at a low logic level at the left edge of the current pixel. For example if the output of XOR block 70 is at a high logic level, indicating the output of edge placement device 20 is at a high logic level at the right edge of the previous pixel and the output of D flip flop 72 is at a high logic level, then the output of XOR gate 74 will be at a low logic level. If this value were loaded into D flip flop 72 on the current pixel, it would set the output of edge placement device 20 at a low logic level on the left edge current pixel. The output of XOR gate 76 represents the logic level necessary at the output of D flip flop 72 to set the output of the edge placement device 20 at the left edge of the current pixel at the logic level specified by the lowest order bit of the transition data value for the data_phase 1.

Examples of the operation of transition latch 66 follow. If the previous pixel included a center justified pulse or left justified pulse, an even number of high logic levels will be present in the data_phase 1 and the data_phase 2. The output of XOR block 70 will be at a low logic level. In addition, the output of edge placement device 20 will be at a low logic level at the right edge of the previous pixel. If the current pixel was to include either a center justified pulse or right justified pulse, the output of edge placement device 20 would be set at a low logic level on the left edge of the current pixel. The lowest order bit of the transition data value for data_phase 1 would be set at a low logic level by transition data generator 52 (to specify a low logic level at the output of edge placement device 20 at the left edge of the current pixel). The value of the lowest order bit of the data_phase 1 output (the Q output of D flip flop 72) was set for the pixel prior to the pixel previous to the current pixel. The value of this lowest order bit may be a high logic level or a low logic level, depending upon what was necessary to create the desired pulse shape for the pixel before the pixel previous to the current pixel.

If the Q output of D flip flop 72 is at a low logic level (before setting it for the current pixel), then the output of XOR gate 74 will be at a low logic low level and the output of XOR gate 76 will be a low logic level. Therefore, the output of D flip flop 72 will stay at a low logic level on the rising edge of nVideoClk 102 as it should. However, if the Q output of D flip flop 72 is at a high logic level, then the output of XOR gate 74 will be at a high logic level and the output of XOR gate 76 will be at a high logic level. Therefore, the output of D flip flop 72 will stay at a high logic level on the rising edge of nVideoClk 102 as it should.

If, the previous pixel included a split justified pulse or a right justified pulse, an odd number of high logic levels will be present in the data_phase 1 and data_phase 2 values and the output of XOR block 70 will be at a high logic level. This corresponds to the output of edge placement device 20 at a high logic level at the right edge of the previous pixel. Assume that the lowest order bit for the transition data value for data_phase 1 was set at a low logic level by transition data generator 52 (for a low logic level at the output of edge placement device 20 at the left edge of the current pixel). If the Q output of D flip flop 72 is at a low logic level, then the output of XOR gate 74 will be at a high logic level and the output of XOR gate 76 will be at a high logic level. On the rising edge of nVideoClk 102, the Q output of D flip flop 72 will transition from a low logic level to a high logic level so that the output of edge placement device 20 will transition to a low logic level at the left edge of the current pixel. If the lowest order bit for the transition data value for data_phase 1 was set a high logic level by transition data generator 52 (for a high logic level at the output of edge placement device 20 at the left edge of the current pixel) then the output of XOR gate 74 will be at a high logic level and the output of XOR gate 76 will be at a low logic level. Therefore, on the rising edge of nVideoClk 102 the Q output of D flip flop 72 will stay at a low logic level as it should to keep the output of edge placement device 20 at a high logic level at the left edge of the current pixel. Transition latch 68 operates in a similar fashion.

Shown in FIG. 5 is a simplified block diagram of edge placement device 20. Edge placement device 20 includes a first part 200 and a second part 202. First part 200 includes a first clock delay chain 204 and first edge placement logic 206. Second part 202 includes a second clock delay chain 208 and second edge placement logic 210. First clock delay chain 204 and second clock delay chain 208 are formed from the same type of elements, although variations in the characteristics of individual elements can cause performance differences between first clock delay chain 204 and second clock delay chain 208. First edge placement logic 206 and second edge placement logic 210 are also formed from the same type of elements. Delay taps, of which delay tap 212 and delay tap 214 are exemplary, from first delay clock delay chain 204 and second clock delay chain 208 are coupled to, respectively, first edge placement logic 206 and second edge placement logic 210. The delay taps provided successively delayed versions of the first clock phase 106 and second clock phase 108 for use by, respectively, first edge placement logic 206 and second edge placement logic 210 to generate one or more transitions during a time period corresponding to a pixel (a pixel time period) according to the pixel data supplied to pulse code logic 18 by rasterizer 16. The outputs of first edge placement logic 206 and second edge placement 210 are combined in an embodiment of transition logic, transition logic transition 216, to generate the video output signal, VDOUT. Transition logic 216 is implemented so that a transition in either of first edge placement logic 206 and second edge placement logic 210 generates a transition in the output. Although in this implementation the assertion level for driver circuit 22 is a high level, other implementations of driver circuit 22 may use a low level for the assertion level. In that case, transition logic 216 would be designed to provide a low level when the output of transition logic 216 is asserted. The VDOUT signal is coupled to driver circuit 22 which provides a signal to laser diode 24.

First clock phase 106 is coupled to an input 218 of first clock delay chain 204. Second clock phase 108 is coupled to an input 220 of second clock delay chain 208. As previously mentioned, pulse code logic 18 generates a first data phase, such as data_phase 1 222, which is coupled to first edge placement logic 206. Pulse code logic 18 also generates a second data phase, such as data_phase 2 224, which is coupled to second edge placement logic 210. First clock phase 106 and second clock phase 108 are generated so that these clock phases are at high levels on alternate cycles of the nVideoClk. Data_phase 1 222 and data_phase 2 224 include the transition data required for creating the desired transition (if any) or transitions in the VDOUT signal at the output of transition logic 216.

Shown in FIG. 6 is an implementation of a clock delay chain, clock delay chain 300 that could be used for either of first clock delay chain 204 and second clock delay chain 208. Clock delay chain 300 includes a plurality of series connected invertors, of which invertor 302 is exemplary. As indicated in FIG. 6, the clock delay chain can be configured to provide an arbitrarily long delay by increasing the number of series connected invertors to achieve the desired delay. The delay taps are located after every two series connected invertors as shown in FIG. 6. The propagation delay of a signal passing through two series connected invertors provides the incremental delay of the clock phase between delay taps of first clock delay chain 204 or second clock delay chain 208. It should be recognized that if the propagation delay of a signal passing through an inverter is sufficiently small, an even number of series connected invertors greater than two may be used to achieve the needed delay between delay taps.

In clock delay chain 300, the delays contributed by each of the invertor elements are designed to be substantially equal. However, it should be recognized that a clock delay chain in which the delay elements are not substantially equal could be used with the first 206 or second edge placement logic 210. To use a clock delay chain having delay elements contributing delays that are not substantially equal, pulse code logic 18 would take the delay variations between taps into account in determining the bit values of the transition data stored in SRAM 50 so that transitions are generated in the VDOUT signal at the desired time during the pixel time period. If increased or decreased resolution in the placement of transitions during the pixel time period is desired, then the delay contributed by each delay element and the total number of delay elements would be adjusted accordingly. That is, for increased resolution, delay elements having shorter delays are used and more delay elements will be required to span a cycle of the VideoClk. For decreased resolution, delay elements having longer delays are used and fewer delay elements will be required to span a cycle of the VideoClk. As the number of delay elements in clock delay chain 300 is changed, the number of bits required to index each of the delay elements in the transition data value also changes. The number of bits required to index n clock delay taps equals the base 2 logarithm of n rounded up to the next integer. For example, if there are 40 delay elements used in clock delay chain 300, then the number of bits required to index 40 delay elements in the transition data value would be six.

It should be recognized that although clock delay chain 300 is implemented using a pair of series connected invertors for the delay element, other delay elements could be used. For example, logic gates such as AND gates, OR gates, NAND gates, NOR gates, XOR gates, or XNOR gates could be used, individually or in combination, to implement delays. Additionally, delay elements could be implemented using combinations of passive components, such as resistors, capacitors, or inductors and active components such as logic gates.

The time delay contributed by each of the delay elements is affected by process variations in the fabrication of the component or components used in the delay elements, the voltage supplied to the delay elements (particularly for the active components), and the temperature. If it is desired that the edge placement logic have the capability to position transitions throughout an entire pixel time period, then clock delay chain 300 would include a sufficiently large number of delay elements so that the sum of all the delays contributed by each of the delay elements would at least equal one period (at its maximum value) of the VideoClk (a period of the VideoClk is substantially equal to the pixel time period) under the conditions (with respect to process, voltage, and temperature) that yield the minimum total delay of clock delay chain 300. An embodiment of edge placement device 20 included 42 delay taps (with each tap spanning 2 series connected invertors) in both first clock delay chain 204 and second clock delay chain 208. During operation, the number of taps spanning a clock period of the VideoClk typically ranges from 18 through 40.

Calibration of the first clock delay chain 204 and second clock delay chain 208 is performed before printing of each page. The calibration determines the number of clock delay taps required to span one cycle of the VideoClk. It should be recognized that although calibration improves the accuracy with which transitions can be placed during the pixel time period, depending upon the required precision for placement of transitions and variation in delay provided by the delay elements, performing repeated calibrations may not be necessary. An initial calibration would be performed to determine the number of clock delay taps required to span one cycle of the VideoClk. If the drift in the delay contributed by the delay elements over time and temperature can be tolerated, then subsequent calibrations would not need to be performed.

Calibration is performed under the control of a firmware routine operating on a processor. Two groups of flip flops have each of their D inputs coupled to one delay tap of either first clock delay chain 204 or second clock delay chain 208. The D flip flops are of a type that has very low susceptibility to meta-stability. The clock inputs of each of these D flip flops is coupled to the VideoClk. On the rising edge of the VideoClk, the D flip flops sample the delayed versions of the VideoClk. By using the processor to measure the outputs of the D flip flops corresponding to both first clock delay chain 204 or second clock delay chain 208, the number of clock delay taps required to span each of the clock delay chains can be determined.

The processor determines the average of the number of clock delay taps required to span one cycle of the VideoClk between the two clock delay chains. Using this information, the processor determines the values of the six bit codes (stored in SRAM 50) that are required to generate each of the pulse shapes for each of the possible pulse widths with the transitions in the pulses placed as desired within the pixel. To accomplish this the processor computes the location of the bit in the transition data value that must be set to a logic high level for each of the four six bit codes at each of the possible pulse widths defined by five bits. This location is computed as the idealized location in terms of the tap number based upon a 1/32 of a pixel resolution, multiplied by the number of clock delay taps required to span one cycle of the VideoClk, divided by 32, and rounded to the nearest integer value.

It may be the case that the calibration determines that fewer than 32 clock delay taps span a period of the VideoClk. The idealized transition locations are the possible transition locations within a pixel time period for the case in which 32 clock delay taps span one period of the VideoClk. The calibration process maps the idealized transition locations to the actual transition locations (corresponding to the clock delay taps spanning one period of the VideoClk) as close as possible to the idealized transition locations. This mapping is performed for all the pulse shapes at all the possible pulse widths. If there are less than 32 clock delay taps to span a period of the VideoClk, greater error will occur in the mapping of idealized transition locations to the actual transition locations and the number of unique actual transition locations will equal the number of delay taps required to span one period of the VideoClk. The increase in error from the mapping occurs because, for some pulse shapes at some pulse widths, the difference in position between the idealized transition locations and the actual transition locations to which those idealized transition locations are mapped increases. If 32 or more delay taps are required to span one period of the VideoClk, the number of unique actual transition locations will equal 32 because five bits are used to define the possible pulse widths.

Shown in FIG. 7 is a timing diagram illustrating the timing relationship between the nVideoClk 102, first clock phase 106, second clock phase 108, data_phase 1 222, and a data_phase 2 224. First set of transition latches 56 and second set of transition latches 58 are each updated with transition data values on the rising edge of the nVideoClk on alternate cycles of the nVideoClk.

Shown in FIG. 8 is a simplified schematic of an embodiment of edge placement logic, edge placement logic 400 that could be used for either of first edge placement logic 206 or second edge placement logic 210. Edge placement logic 400 includes a plurality of storage elements, such as rising edge triggered D type flip flops, of which flip flop 402 is exemplary. Although edge placement logic 400 is implemented using rising edge triggered D type flip flops, any edge triggered storage element could be used. The data phase input (either data_phase 1 222 or data_phase 2 224) includes the signals provided on lines 404. Each of lines 404 corresponds to one bit of the transition data value provided from first set of transition latches 56 or second set of transition latches 58. The number of flip flops included in edge placement logic 400 equals the number of taps from the corresponding clock delay chain. The number of signals provided on lines 404 equals the number of flips flops in edge placement logic 400. The Q outputs of the flips flops in edge placement logic 400 are combined using transition logic 216. Although transition logic 216 is shown in FIG. 8 as receiving signals from only edge placement logic 400 (for simplicity of illustration), it should be recognized that two groups of edge placement logic supply signals to transition logic 216 in edge placement device 20. The connection of bits from either first transition latches 56 or second transition latches 58 to, respectively, first edge placement logic 206 or second edge placement logic 210 is done so that successively higher order bits are coupled to the D inputs of D type flip flops clocked with delayed clocks having successively greater delays. This results in the location of the transitions generated by transition logic 216 during a pixel corresponding to those specified by either data_phase 1 222 or data_phase 2 224. Because the delayed clocks supplied to the D type flip flops are delayed versions of either first clock phase 106 or second clock phase 108, the timing of the transitions on the outputs of the D type flip flops occurs relative to the rising edge of the VideoClk.

Shown in FIG. 9 is an embodiment of transition logic, transition logic 216 that is implemented using an array of cascaded two input XOR gates, of which XOR gate 500 is exemplary. Transition logic 216 performs the function of generating a transition at the output of XOR gate 502 when a transition occurs on any of the D flip flops in either of first edge placement logic 206 or second edge placement logic 210. Viewed in another way, transition logic 216 provides a high logic level at its output when there are an odd number of high logic levels at its inputs and its provides a low logic level at its output when there are an even number of high logic levels at its inputs. Therefore, if there are an even number of logic high levels at the input of transition logic 216 and one of the corresponding data phase bit values transitions from a high level to a low level or from a low level to a high level (thereby creating an odd number of logic high levels), the output of transition logic 216 will transition from a low level to a high level on the rising edge of the delayed clock corresponding to the data phase bit that transitioned (after the propagation delay of transition logic 216). If there are an odd number of logic high levels at the input of transition logic 216 and one of the corresponding data phase bit values transitions from a low level to a high level or a high level to a low level (thereby creating an even number of logic high levels), the output of transition logic 216 will transition from a high level to a low level. Although transition logic 216 is implemented to have a high assertion level, by using an XNOR gate in place of XOR gate 502, the output of transition logic 216 would have a low assertion level.

Transition logic 216 is implemented to control the variations in propagation delay between different paths transitions can take within transition logic 216. For example, consider an implementation of transition logic 216 that includes multiple levels of cascaded XOR gates. It is possible to have transitions that occur on different branches of XOR gates that propagate through different XOR gates to cause a transition in the output. These propagation delay differences result in error in the placement of transitions during the pixel time period. In addition differences in XOR gate transition times from a high level to low level and from a low level to a high level result in error in the placement of transitions during the pixel time period. To reduce this source of error in the placement of transitions, the XOR gates included in transition logic 216 are constructed to have closely matched propagation times and closely matched low to high and high to low transition times. One implementation of transition logic 216 has achieved variations in transitions from any input to the output of no more than 100 pico seconds.

It should be recognized that other logic configurations may be used to implement the transition logic. The important functional aspect is the ability to generate a transition out the output of the transition logic for any transition at the input of the logic. If a high level of precision is desired in the placement of the transition for these other logic configurations, consideration must be given to the differences in propagation delays of different paths that logic level transitions may take.

The clock inputs of the plurality of flip flops are coupled to the taps from the corresponding clock delay chain. Therefore, successive flips flops in the plurality of D flip flops are clocked using successively delayed clocks, each delayed by the incremental delay provided between delay taps. Accordingly, the transitions on the Q outputs of successive D flip flops (assuming the D inputs are set so that there will be a transition) are delayed in time by the time increment between successive taps in the clock delay chain. The transition logic that combines the Q outputs of the plurality of D flip flops acts as a transition detector. The transition of the Q outputs of the D flip flops are delayed with respect to each other because of the delayed clocks applied to the D flip flops. Whenever the clocking of one of the D flips flops generates a transition in the Q output, the output of the XOR gate coupled experiences a transition.

Furthermore, because all of the D flip flops are each coupled to different taps from the corresponding clock delay chain, the minimum time difference that can be achieved between transitions in the Q outputs is substantially equal to the minimum time between successive taps in the corresponding clock delay chain. Therefore, differing propagation times of individual gates in the transition logic will not generate glitches (unintended transitions) in the output of the transition logic.

To understand the operation of edge placement logic 400, consider the case in which it is desired to deliver the pulse 600 shown in FIG. 10 to driver circuit 22 during the pixel time period 602 (i.e. during a single period of the VideoClk 604). The pulse shown in FIG. 10 includes 2 transitions between successive rising edges of VideoClk 604. The data defining this pulse is generated by rasterizer 16 and supplied to pulse code logic 18. Pulse code logic 18 generates either data_phase 1 222 or data_phase 2 224 (data_phase 1 222 and data_phase 2 224 specify the locations of transitions in the pixel on alternate pixels and the state of SelectClk 105 determines which one corresponds to the current pixel) based upon the data supplied by rasterizer 16.

To generate pulse 600, transition data value supplied by pulse code logic 18 sets the bits so that the least significant bit is set to a high logic level (because part of pulse 600 is left justified at the beginning of the pixel time period). The bit corresponding to the timing of the high logic level to low level logic transition during the pixel time period of pulse 600 is set to a high logic level. And, the bit corresponding to the transition from a low logic level to a high logic level during the pixel time period is also set at a high logic level. The rest of the bits forming the transition data value are set at a low logic level. The bits of the transition data value are supplied to the D inputs of the flip flops on the rising edge of the nVideoClk. By controlling the logic level of the bits supplied to the D flip flops having successively delayed clocking, the timing of the transitions at the output of the transition logic can be controlled to achieve the desired pulse width and shape during the pixel time period.

When the successively delayed versions of, as applicable, first clock phase 106 or second clock phase 108 transition from a low logic level to a high logic level on the clock inputs of the D flip flops to which they are connected, the corresponding Q outputs are set to the logic level of the D input. If the D inputs were changed from a low logic level (at the previous rising edge of the corresponding clock phase) to a high logic level, a low to high logic level transition will be generated on the Q output which will cause a transition at the output of transition logic 216 to apply to laser drive circuit 22, thereby affecting pulsating beam 26. Those D flip flops for which the D input is unchanged from the previous rising edge of the clock will not generate a transition on the Q output and therefore not generate a transition at the output of transition logic 216.

First edge placement logic 206 and second edge placement logic 210 include rising edge triggered D type flip flops that are clocked by, respectively, taps from first clock delay chain 204 and second clock delay chain 208. The rising edges of first clock phase 106 (corresponding to data_phase 1 222) and second clock phase 108 (corresponding to data_phase 2 224) each occur approximately one half clock period of the nVideoClk after the rising edge of the nVideoClk. Because of this delay between the transitions of first data phase 222 and second data phase 224 and respective rising edges of first clock phase 106 and second clock phase 108, the data setup times for the flip flops in first edge placement logic 206 and second edge placement logic 210 will always be met for data_phase 1 222 and data_phase 2 224 for all of the delay taps.

The data hold times for the flip flops included in the first edge placement logic 206 and second edge placement logic 210 must also be met to avoid meta-stability problems. It is possible for D flip flops using clock delay chain taps toward the end of the clock delay chain that the cumulative delay generated by the corresponding clock delay chain sufficiently delays the application of the rising edge of the clock to its corresponding D flip flop so that the required minimum data hold times are not met. This would occur if less than all of the delay taps in the clock delay chain span the time period of the VideoClk 604. For those taps that delay the first phase clock 106 or the second phase clock 108 beyond the time period of the VideoClk 604, the data hold times for the data applied on the previous rising edge of the nVideoClk would not be met. To prevent possible meta-stability that could arise from attempting to provide transitions to the D flip flops having clocks delayed for more than a VideoClk time period, the D inputs to these flip flops are held at a low logic level. The transition data values generated by pulse code logic 18 are set so that those bits corresponding to delays beyond the VideoClk 604 time period are held at a low logic level. Holding these bits at a low logic level ensures that the data hold times will be met for all flip flops that can experience transitions. The previously mentioned calibration performed at predetermined time intervals determines the number of delay taps substantially equal to a VideoClk time period. The transition data values in SRAM 50 are set based upon this calibration.

Edge placement device 20 uses first clock phase 106, second clock phase 108, first edge placement logic 206, and second edge placement logic 210 to set the transitions during the pixel time period during each cycle of the VideoClk 604. Pulse code logic 18 is configured to supply data_phase 1 222 and data_phase 2 224 on alternating clock cycles to first edge placement logic 206 and second edge placement logic 210. By using two clock phases to alternately supply data defining the transitions and by positioning the rising edge of each of the clock phases at the falling edge of nVideoClk 102, there is sufficient time to locate transitions over the entire pixel time period while meeting the data setup and hold times of the D flip flops in the edge placement logic used to determine the pulse shape and width.

Variations in process, voltage, and temperature can cause variations in the propagation delay of the invertors by a factor of up to 2.7. For example, the propagation delay through an inverter may range from 100 ps up to 270 ps. For an inverter on the lower end of the propagation delay range (resulting from a process producing a fast inverter and operating at high voltage and low temperature) nearly the entire delay chain would be required to span one period of VideoClk 604. To ensure that there are sufficient delay taps to span one period of VideoClk 604 over the range of expected variations in process, voltage, and temperature, each of the clock delay chains includes 40 delay taps. For an inverter on the higher end of the propagation delay range (resulting from a process producing a slow inverter and operating at low voltage and high temperature) many of the delay taps would generate delays beyond one period of VideoClk 604. For example, as shown in FIG. 7, the rising edge of first clock phase 106 and second clock phase 108 occurs on the falling edge of nVideoClk 102. Therefore, it is possible that for propagation delays on the higher end of the propagation delay range, the rising edge on the output of the 40th delay tap (as well as other delay taps) occurs beyond the period of nVideoClk 102 in which the rising edge of the clock phase occurs.

Because first clock delay chain 204 and second clock delay chain 208 provide the clock signals to load, respectively, data_phase 1 and data_phase 2 into first edge placement logic 206 and second edge placement logic 210, meta-stability problems could occur for those D flip flops in first edge placement logic 206 and second edge placement logic 210 that are clocked by the delay taps toward the end of the clock delay chains if the data hold time for those D flip flops is not met. However, because two clock phases are used and data_phase 1 and data_phase 2 are changed on the rising edge of nVideoClk 102 on alternate cycles of nVideoClk 102, the data hold times for all the D flip flops will be met and therefore meta-stability problems will not occur.

Meta-stability problems can also occur if data setup times are not met. Changing the data_phase 1 and data_phase 2 on the rising edge of nVideoClk 102 and locating the rising edge of first clock phase 106 and second clock phase 108 on the falling edge of nVideoClk 102 ensures that the data setup time for all the D flip flops in first edge placement logic 206 and second edge placement logic 210 will be met. Locating the rising edges of first clock phase 106 and second clock phase 108 in this manner is made possible by using two clock phases and applying data_phase 1 and data_phase 2 to their respective edge placement logic on alternate cycles of nVideoClk 102.

It should be recognized that although embodiments of the edge placement device are discussed in the context of using two clock phases to ensure that data setup and data hold times are met, more than two clock phases could also be used to ensure that data setup and data hold times are met. Use of more than two clock phases would include additional hardware for additional clock delay chains, additional transition data latches, additional edge placement logic, and an increased number of inputs for the transition logic.

Although first clock delay chain 204 and first edge placement logic 206 are substantially similar in performance to second clock delay chain 208 and second edge placement logic 210, it is likely that manufacturing process variability will result in some degree of difference in placement of the transitions during the pixel time period between the first part 200 and second part 202 of edge placement device 20. In forming an image on media, particularly in halftoned regions, it is possible that these performance differences will result in visible artifacts. The image is formed by selectively exposing successive adjacent lines of pixels across the width of the photoconductor. If, the corresponding pixel elements in scan lines on photoconductor drum 30 before and after a given scan line are formed by alternately using first edge placement logic 206 and second edge placement logic 210, differences in the placement of edges within the pixel for identical pulse code logic transition data values can cause visually perceptible artifacts. To prevent this from occurring, before the beginning of the scan line, SelectClk 105 is reset so that gating switch 54 will direct the transition data to the same transition data latches and therefore the same edge placement logic and clock delay chain as was used for the first pixel of the preceding scan line.

Although several embodiments of the invention have been illustrated, and their forms described, it is readily apparent to those of ordinary skill in the art that various modifications may be made to these embodiments without departing from the spirit of the invention or from the scope of the appended claims.

What is claimed is:

1. In an imaging device, an edge placement device to generate a transition, comprising:
   a first clock delay chain to generate a first plurality of delayed versions of a first clock;
   a first plurality of storage elements arranged to each receive a different one of a first plurality of signals and a different one of the first plurality of delayed versions of the first clock to generate a first plurality of outputs during a first cycle of a third clock;
   a second clock delay chain to generate a second plurality of delayed versions of a second clock;
   a second plurality of storage elements arranged to each receive a different one of a second plurality of signals and a different one of the second plurality of delayed versions of the second clock to generate a second plurality of outputs during a second cycle of the third clock; and
   transition logic to generate the transition using the first plurality of outputs and the second plurality of outputs.

2. The edge placement device as recited in claim 1, wherein:
   the transition logic includes a configuration to generate the transition by combining each of the first plurality of outputs and the second plurality of outputs.

3. The edge placement device as recited in claim 2, further comprising:
   a clock generator to generate the first clock and the second clock based upon the third clock, with the clock generator coupled to the first clock delay chain and the second clock delay chain.

4. The edge placement device as recited in claim 3, wherein:
   a period of the first clock substantially equals twice a period of the third clock; and
   a period of the second clock substantially equals twice the period of the third clock.

5. The edge placement device as recited in claim 4, wherein:
   cycles of the first clock each includes a rising edge occurring substantially simultaneously with a falling edge of the third clock; and
   cycles of the second clock each includes a rising edge occurring substantially simultaneously with the falling edge of the third clock; and
   the rising edge of the first clock and the rising edge of the second clock occur on alternate cycles of the third clock.

6. The edge placement device as recited in claim 5, wherein:
   the transition logic includes a plurality of cascaded two input XOR gates, with the plurality of cascaded two input XOR gates configured to generate the transition based upon the first plurality of outputs and the second plurality of outputs.

7. The edge placement device as recited in claim 6, wherein:
   each of the first plurality of storage elements and each of the second plurality of storage elements includes a D flip flop.

8. The edge placement device as recited in claim 7, wherein:
   the first clock delay chain includes a first plurality of inverters coupled in series and the second clock delay chain includes a second plurality of inverters coupled in series, with each of the first plurality of delayed clock signals and each of the second plurality of delayed clock signals formed from two of the inverters coupled in series.

9. In an imaging device, a method for generating a plurality of transitions, comprising:
   generating a first plurality of logic values using a first predetermined value;
   generating a first group of the plurality of transitions, according to the first plurality of logic values, after a first clock changes state in a first cycle of a second clock;
   generating a second plurality of logic values using a second predetermined value; and
   generating a second group of the plurality of transitions, according to the second plurality of logic values, after a third clock changes state in a second cycle of the second clock, where the first clock and the third clock change states in alternate cycles of the second clock.

10. The method as recited in claim 9, wherein:
   generating the first group of the plurality of transitions includes generating at least one of the transitions; and
   generating the second group of the plurality of transitions includes generating at least one of the transitions.

11. The method as recited in claim 10, wherein:

generating the first plurality of logic values occurs substantially simultaneous with the second clock changing state;

generating the second plurality of logic values occurs substantially simultaneous with the second clock changing state.

12. The method as recited in claim 11, wherein:

the change in state of the first clock in the first cycle occurs substantially simultaneous with a change in state of the second clock in the first cycle; and the change in state of the third clock in the second cycle occurs substantially simultaneous with a change in state of the second clock in the second cycle.

13. An electrophotographic imaging device for forming images using print data, comprising:

a photoconductor;

a rasterizer to generate pixel data corresponding to the print data;

pulse code logic to generate a first plurality of signals and a second plurality of signals from the pixel data;

an edge placement including a first clock delay chain to generate a first plurality of delayed versions of a first clock, a first plurality of storage elements arranged to each receive a different one of the first plurality of signals and a different one of the first plurality of delayed versions of the first clock to generate a first plurality of outputs during a first cycle of a third clock, a second clock delay chain to generate a second plurality of delayed versions of a second clock, a second plurality of storage elements arranged to each receive a different one of the second plurality of signals and a different one of the second plurality of delayed versions of the second clock to generate a second plurality of outputs during a second cycle of the third clock, and transition logic to generate video data using the first plurality of outputs and the second plurality of outputs; and a photoconductor exposure system for forming a latent electrostatic image on the photoconductor corresponding to the video data.

14. The electrophotographic imaging device as recited in claim 13, wherein:

the pulse code logic includes a memory and a transition data generator, with the transition data generator configured to generate transition data using contents of the memory and the pixel data; and the pulse code logic includes a first plurality of transition latches configured to generate the first plurality of signals using the transition data and a second plurality of transition latches configured to generate the second plurality of signals using the transition data.

15. The electrophotographic imaging device as recited in claim 14, wherein:

the edge placement device includes a clock generator to generate the first clock and the second clock using the third clock; and the pulse code logic includes a configuration to generate the first plurality of signals and the second plurality of signals on alternate cycles of the third clock.

16. The electrophotographic imaging device as recited in claim 15, wherein:

a period of the first clock substantially equals twice a period of the third clock; and a period of the second clock substantially equals twice the period of the third clock.

17. The electrophotographic imaging device as recited in claim 16, wherein:

the first clock includes a first rising edge occurring substantially simultaneous with a falling edge of the third clock; and the second clock includes a second rising edge occurring substantially simultaneous with the falling edge of the third clock; and the first rising edge of the first clock and the second rising edge of the second clock occur on alternate cycles of the third clock.

18. The electrophotographic imaging device as recited in claim 17, wherein:

the transition logic includes a plurality of cascaded two input XOR gates, with the plurality of cascaded two input XOR gates configured to generate the video data based upon the first plurality of outputs and the second plurality of outputs.

* * * * *